April 17, 1973   H. GNUTZMANN ET AL   3,728,218
CONTROL RODS FOR NUCLEAR REACTORS
Filed May 24, 1971   2 Sheets-Sheet 1
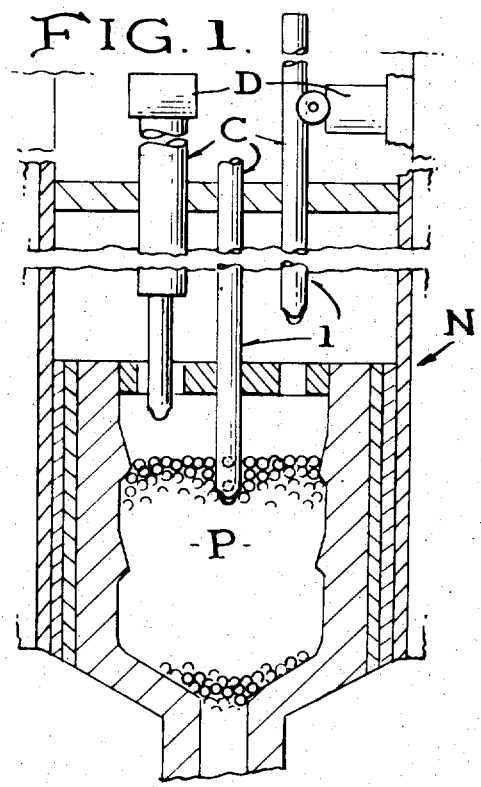
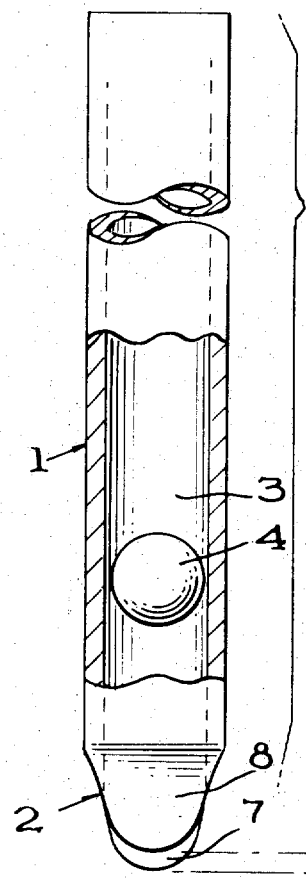
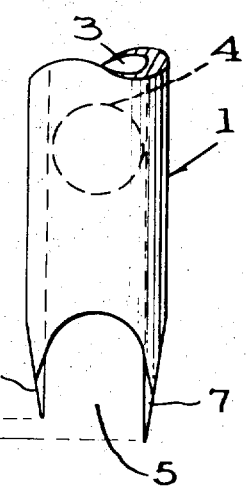
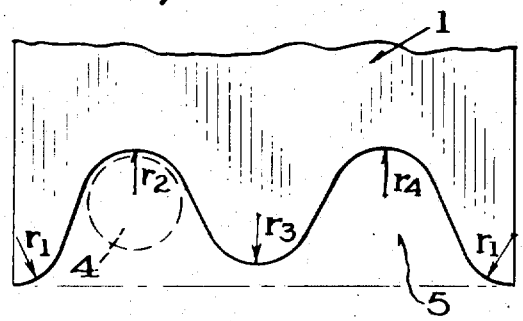
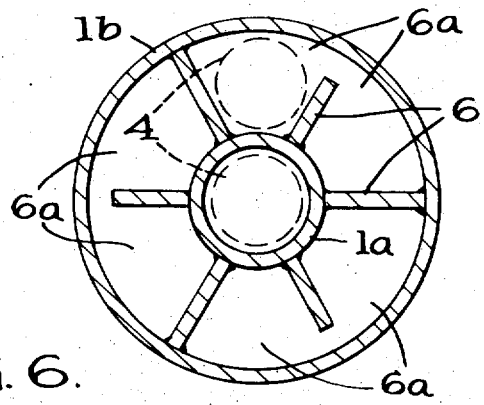
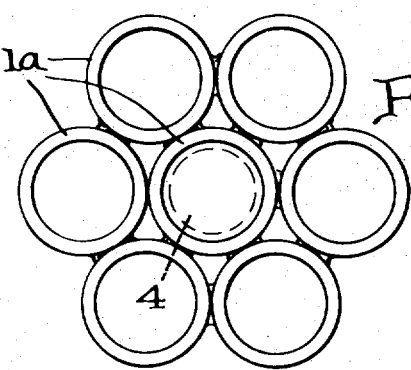
INVENTORS
HEINRICH GNUTZMANN
HOLGER KASSLER
BY Wenderoth, Lind & Ponack
ATTORNEYS

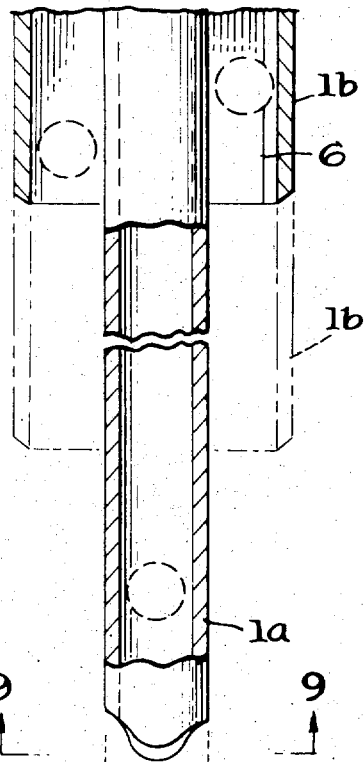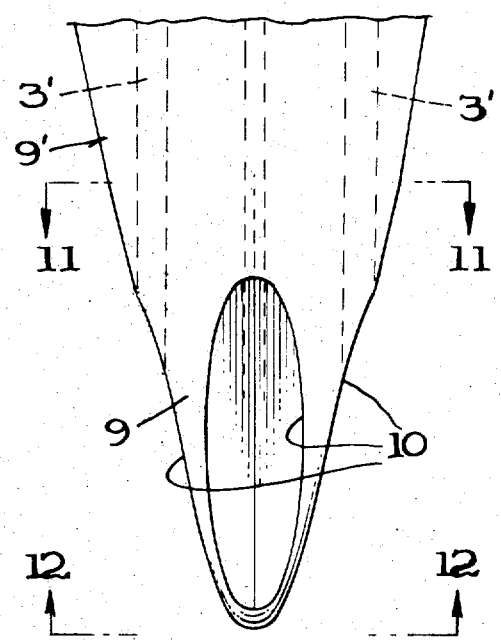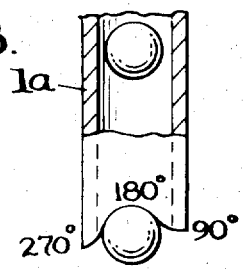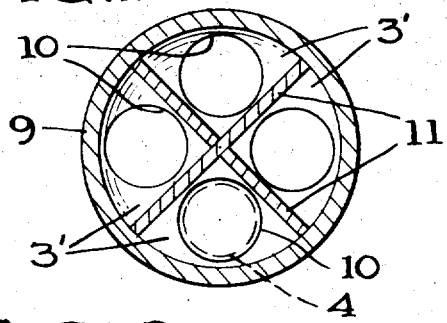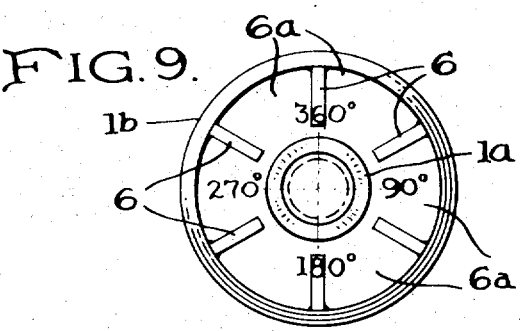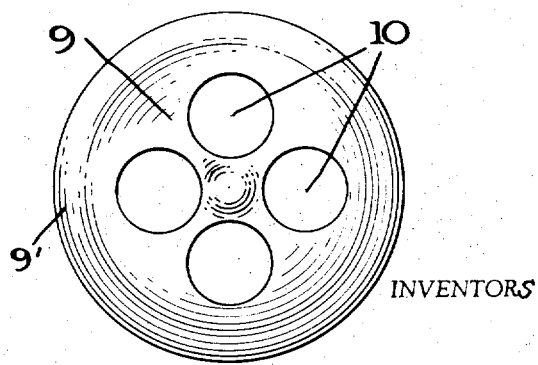

United States Patent Office 3,728,218
Patented Apr. 17, 1973

3,728,218
CONTROL RODS FOR NUCLEAR REACTORS
Heinrich Gnutzmann, Mannheim, and Holger Kassler, Hannover, Germany, assignors to Brown Boveri/Krupp Reaktorbau G.m.b.H.
Continuation-in-part of application Ser. No. 765,955, Oct. 8, 1968. This application May 24, 1971, Ser. No. 146,288
Int. Cl. G21c 7/10
U.S. Cl. 176—36 R 21 Claims

ABSTRACT OF THE DISCLOSURE

A control rod for use in combination with a nuclear reactor system which comprises a pebble-bed reactor containing a loose pile of ball-shaped fuel elements into which the control rod is insertable, said rod being hollow and having defined in its hollow interior one or more channels for receiving fuel elements. The fuel elements are adapted to enter the channels via at least one entry opening at one end of the control rod. The control rod may be relatively smoothly tapered or have abrupt changes of cross-section with additional entry openings in both the tapered or abrupt change cross-section areas to receive other fuel elements.

---

The present invention is a continuation-in-part of our earlier application Ser. No. 765,955 filed Oct. 8, 1968, now abandoned.

BACKGROUND AND OBJECTS OF INVENTION

The present invention relates to neutron absorbers or control rods for use in combination with nuclear reactors of the pebble-bed type which contain a loose pile of preferably spherical fuel elements into which the control rods are freely insertable.

In such an arrangement in which control rods are freely insertable into a pile of spherical fuel elements, the fuel elements and the control rods are subject to considerable wear and the percentage breakage of the fuel elements is usually high. The forces involved primarily depend upon the magnitude of the displacing volume of each rod.

An object of the present invention is the provision of a control rod which can freely penetrate a loose pile of fuel elements, and wherein during said penetration the leading end of said control rod imparts only gentle thrusts to the fuel elements.

Another object of the invention is to provide a control rod having improved efficiency.

SUMMARY OF THE INVENTION

The invention comprises improved control rods for use in combination with a nuclear reactor containing a loose pile of fuel elements into which pile the control rod is freely insertable, and wherein the control rod is hollow and has defined in its hollow interior at least one channel for the reception therein of at least one fuel element with at least one entry opening being formed at one end of the control rod and communicating with the channel to allow the passage thereinto of at least one fuel element. The size of the entry opening and the channel are preferably just large enough to receive an individual pebble or ball-like fuel element.

The hollow construction of the control rod considerably reduces the displacement volume of the rod in the loose pile of fuel elements because the latter can enter the interior of the rod through the openings in its end. The end of the rod and the channels therewithin are so contrived that the fuel elements upon entering the interior of the rod and during their presence inside the rod, experience minimum resistance and that a maximum number of fuel elements can be received into the rod interior. The former is achieved by providing minimum clearance between the openings or channel walls and the fuel elements. The shape of the openings is adapted to the configuration of the fuel elements. By suitably shaping the openings and channels, the entering fuel elements can be subjected to an aligning effect.

The reactivity of the fuel elements which have entered the hollow control rod is compensated at the internal surface of the rod. In a control rod according to the invention, both the external and internal surfaces of the rod are therefore effective. Such a rod thus has a better controlling effect than a solid rod. This means that the necessary number of control rods can be reduced.

An advantage afforded by the improved control rods according to the invention is that the breakage percentage of fuel elements within the pebble bed is much lower and therefore the employment of fuel elements that are particularly crush resistant is unnecessary. Hence the operating costs of a nuclear reactor equipped with the improved control rods according to this invention are much lower than those of a reactor using solid control rods.

Another saving in expense may be expected from the fact that the proposed control rods are easier to manufacture since a special end need not be attached to the rod.

Moreover, in a solid rod, the end is "inactive," i.e. it is substantially ineffective as a neutron absorber. The hollow rod in which this effect does not arise, need not therefore penetrate as deeply into the bed to achieve the same controlling effect. This results in a further reduction in the wear experienced by the rod and fuel elements.

Preferably, the defined channels in the rod interior for the reception therein of the fuel elements are formed by partition members. A simple member comprising two interior walls disposed at right angles is sufficient for dividing the rod interior into four channels, as seen in FIGS. 10 and 11.

Another advantageous further development of the proposed control rod resides in providing the rod with different cross-section in different zones along its length. The change in cross-section may be relatively gradual, as in FIG. 10, or it may be quite abrupt, as seen in FIG. 7. This arrangement increases the effective neutron absorbing surface and hence improves the neutron absorption efficiency of the rod without simultaneously increasing the forces that arise at the end of the rod to adversely affect the fuel elements. The controlling effect of the rod can thus be improved.

Preferably, control rods having the abrupt changes in cross-section may contain additional channels originating where the cross-sections change. By providing special entry openings, further fuel elements can be received into these additional channels.

The abrupt changes in cross-section may with some advantage be created by grouping several control rods together, usually round a central rod, as per FIG. 6. Another form may be by providing a larger diameter outer tube concentrically around a central tube, and divided into individual channels by means of radial division walls interposed therebetween at predetermined circumferential spacings. FIGS. 5 and 9 show variations of this latter form wherein the division walls may be attached to one or the other or to both of the inner or outer tubular members. By attaching only to the outer sleeve, the center tubular rod may be mounted to telescope relative to the outer tube. This principle permits the external shape of a neutron absorbing unit to be varied in a simple way.

The bottom end of the control rod may be undulated and adapted to the shape of fuel elements. It may be relatively blunt or coned, or it may be formed with one uniform or a plurality of compound tapering faces.

According to the shape and size of the fuel elements the taper faces may be like or unlike, i.e. the ends of the taper faces may have the same or different radii, and include an undulating shaped terminal end portion.

BRIEF DESCRIPTION OF DRAWINGS

In order that the invention may be more clearly understood, embodiments thereof will now be described by way of example, reference being made to the accompanying drawings, in which:

FIG. 1 is a fragmentary semi-schematic showing of an illustrative pebble bed type nuclear reactor with the control rods in combination therewith;

FIG. 2 is an enlarged longitudinal view, partly in elevation and partly in cross-section, of one form of control rod of preferably circular and relatively uniform cross-section, with a gradually tapered lower terminal end;

FIG. 3 is a fragmentary side elevational view of a lower portion of the control rod such as that of FIG. 2 as viewed at approximately 90° from that of FIG. 2;

FIG. 4 is a schematic developed plan view of the lower end of the control rod of FIGS. 2 and 3 showing more clearly the undulating end surface of varying length end portions to facilitate entry of the ball-shaped fuel elements one after another;

FIG. 5 is an end view of one form of the multiple channel control rod;

FIG. 6 is an end view of another form of multiple channel control rod, such as fabricated from a combined group of individual rods;

FIG. 7 is a smaller scale fragmentary view partly in cross-section and partly in elevation of a modified composite form of control rod having a relatively abruptly changing cross-section;

FIG. 8 is a fragmentary view of the lower end of the rod of FIG. 7 taken at approximately 90° to one side thereof;

FIG. 9 is an end elevational view of the lower terminal end of the rod of FIGS. 7 and 8 better showing a plurality of six circumferential channels disposed around the central channel;

FIG. 10 is an enlarged fragmentry elevational view of the lower end of a further modification of control rod having a relatively gradually changing cross-section embodying a plurality of four parallel channels;

FIG. 11 is a cross-sectional detail view taken on line 11—11 of FIG. 10; and

FIG. 12 is an end elevational view seen on line 12—12 of FIG. 10 of the lower end of the rod thereof.

DESCRIPTION OF PREFERRED EMBODIMENTS

The combination of reactor and rods is depicted illustratively in FIG. 1, wherein the nuclear reactor is designated generally at N, the pebble-bed of fuel elements is designated P, the control rods are designated C, and the drive means for effecting insertion of the rods into the pebble-bed is designated D. Such latter means may have the form of mechanical drive means, or may be manually insertable with help of weights to move by gravity, and with suitable counterweight means to aid in the withdrawal or retraction of the rods.

The hollow control rod of FIG. 2 is of circular cross-section and basically comprises part 1 having an entry terminal end 2. A central channel 3 extends through the interior of the control rod, the diameter of the channel being slightly larger than the diameter of a generally ball-shaped fuel element 4. During the insertion of the control rod into a loose pile of fuel elements, the fuel element 4, as shown in FIG. 2, has been pushed through an entry opening 5 and received into the channel 3. The entry opening 5 is formed in the tapered rod end which has two opposed tapering sides 7 and 8, as illustrated in greater detail in FIG. 3.

In a composite form of rod, as shown in FIG. 5 or 7, the center part 1a is concentrically encircled by a larger diameter tube 1b, divided by radial walls or wall segments 6 to form a plurality of additional channels 6a also capable of receiving other of the fuel elements respectively. These fuel elements can be received into these channels 6a through additional entry openings in the region where the cross-section changes. It is understood that the entry openings and tubular cross-sections may vary to correspond generally to the particular shape of the fuel elements being used in the particular reactor.

If the control rod is merely intended to control the condition of the nuclear reactor, only part 1, or 1a in FIG. 7, of the rod having the smaller cross-section need be inserted in the loose pile of fuel elements, assuming that the rod has been appropriately designed. Generally the part 1b having the larger diameter is not introduced into the pile unless complete shutdown is desired in some installations.

FIGS. 3 and 4 better disclose the entry 5 for fuel elements 4 with FIG. 4 showing the opening in a developed form within the plane of the paper. The radii $r_2$ and $r_4$ which permit the entry of a fuel element 4 must be so chosen that the spherical elements cannot jam. The radii $r_1$ and $r_3$ at the two opposed sides 7 and 8 should differ or otherwise have one longer than the other to prevent two fuel elements from striking the two points simultaneously.

The particular undulating type shape of the end of the rod ensures the entry of the balls one after the other.

FIGS. 7 and 8 depict a slightly modified preferred form of rod of which the opposed sides 7' and 8' are not tapered, although they are of unequal lengths for the same reason above, and assure no retarding of the entry into the pile of fuel elements.

FIG. 10 shows a further modified control rod which has a cross-section that more gradually increases up the rod. The bottom end 9 of the rod forms a relatively blunt or rounded cone-like nose and contains entry openings 10 which merge into channels 3' ascending the interior of the control rod. The openings 10 are elongated or ovoid in appearance due to the taper 9. A second and different tapered area commences above the openings 10 and is generally designated at 9'. As will be understood from FIG. 11, four channels 3' are provided. These are divided by a two-part skeleton framework 11. The channels 3' are understood to be able to receive fuel elements 4 which gain access into the rod through the entry openings 10.

FIG. 12 is a view of the end 9 of the rod and shows the entry openings 10 for the fuel elements particularly clearly. The diameter of the entry openings 10 only slightly exceeds that of the fuel elements 4.

In order to make the entry effect of the fuel elements into the rod as effective as possible, the circle upon which the entry centers are situated should have the smallest possible radius. Also, the walls of the tubes should not be excessively thick so as to take up as little as possible displacement in the pebble bed.

Accordingly, it is apparent from the foregoing that various improved forms of control rods have been evolved which achieve and satisfy the objective and advantages set forth in the preamble and elsewhere throughout this specification. The control rods are used particularly in combination with a nuclear reactor of the pebble bed type in order to achieve the stated advantages.

While several detailed variations of the rods have been shown and described, other variations and modifications may be made by or may suggest themselves to those skilled in the art without departing from the inventive concept, such as the single channel, when used in combination with additional plural channels need not necessarily be disposed centrally of the others, but may nevertheless serve a useful form of rod. Similarly, if one of the plurality of tubular channels or other suitable means forming the channels should be preferred to be telescopic relative to the others, it need not be a center one. Particular attention is invited to the appended claims for a better definition of the scope of the invention.

What is claimed is:

1. In a nuclear reactor system, the improved apparatus comprising, in combination:
    (a) a pebble-bed nuclear reactor comprising an enclosed pile of loose ball-shaped fuel elements constituting the pebble-bed, said pile poistioned within a vessel, and into which pile a control rod is mechanically insertable;
    (b) at least one control rod having a fuel-element-insertable entry end and having a hollow interior of generally circular cross-section, comprising at least one channel for receiving therein at least one fuel element responsive to rod insertion into said pebble-bed;
    (c) means for effecting a predetermined insertion of said control rod directly into said pile of fuel elements;
    (d) said entry end of said control rod having at least one entry opening communicating with said channel to allow the passage thereinto of at least said one fuel element; and
    (e) the size of said entry opening and channel being of a cross-sectional size slightly greater than the diameter of a fuel element and sufficient to receive only one individual fuel element at a time, one after the other, depending upon the depth of insertion into said pile of fuel elements.

2. Apparatus as defined in claim 1 wherein the control rod is of a diametrical size to accommodate a plurality of channels in side-by-side relation, and includes partition means provided within the hollow interior to divide the hollow interior into a plurality of said channels.

3. Apparatus as defined in claim 1 wherein the control rod has a length of a single channel for a predetermined distance from the entry end, and wherein the diametrical cross-section of the control rod increases relatively abruptly along the length at a predetermined point removed from the entry end to a predetermined larger cross-sectional area.

4. Apparatus as defined in claim 3 wherein said rod hollow interior in the enlarged cross-sectional area is provided with additional channels for the reception of other fuel elements, and including further entry openings respectively communicating with said additional channels and being provided in the region where the cross-section abruptly increases.

5. Apparatus as defined in claim 1 wherein said entry end of the control rod has opposed portions tapering to a partially semi-pointed nose.

6. Apparatus as defined in claim 5 wherein said opposed end portions of the control rod terminate in an irregular arcuately curved manner whereby the end-most surface is of undulating character and has one portion of greater longitudinal length than the other opposed portion so that engagement and entry of the fuel elements is not retarded, but is enhanced to facilitate entry one after the other of the fuel elements.

7. Apparatus as defined in claim 1 wherein said entry end of the control rod has a relatively rounded semi-blunt end defined by an irregular undulating endmost surface forming at least two generally opposed elongated endmost areas of different relative lengths so as to facilitate engaging a ball-shaped fuel element only at one point and to enhance entry into the interior channel of said rod.

8. Apparatus as defined in claim 1 wherein said control rod further comprises a plurality of tubular rods of generally circular cross-section grouped together in a longitudinally parallel manner to provide a plurality of fuel-element-receiving channels.

9. Apparatus as defined in claim 1 wherein the diametrical cross-section of the control rod increases relatively gradually along the length relatively closely adjacent the entry end thereof.

10. Apparatus as defined in claim 9 wherein said rod hollow interior is provided with additional channels for the reception of other fuel elements, and including further entry openings respectively communicating with said additional channels and being provided in the region where the cross-section gradually increases.

11. Apparatus as defined in claim 9 wherein the entry end of said control rod tapers to generally rounded conical formation and the channel entry openings have an elongated generally ovaloid appearance when viewed in side elevation.

12. Apparatus as defined in claim 9 wherein said entry end of said control rod has a compound taper with a first taper area directly adjacent the foremost part of the entry end being more pronounced than that of a second less pronounced taper area disposed adjacently removed from said first taper area.

13. In a nuclear reactor system which comprises a pebble-bed reactor containing a lose pile of ball-shaped fuel elements within a vessel and having means for inserting directly into said pile a control rod in a mechanically insertable manner, the improvement comprising, in combination:
    (a) control rod means including a control rod having an end for entry into said pile and having a hollow interior comprising at least one channel for receiving therein at least one fuel element at the entry end thereof;
    (b) at least one entry opening formed at said entry end of the control rod means and communicating with said channel in said control rod to allow passage thereinto of at least said one fuel element responsive to a predetermined insertion of the rod into the pile of fuel elements; and
    (c) the size of said entry opening and channel being of a size slightly greater than the diameter of a fuel element sufficient just to receive only one individual fuel element at a time, one after the other.

14. Control rod means for use in a nuclear reactor system as defined in claim 13 wherein said entry end of the control rod tapers to a generally rounded, semi-pointed nose.

15. Control rod means as defined in claim 13 wherein said control rod is of a uniform diametrical size for a predetermined length to provide a single channel with entry openings, and at a predetermined area from the entry end includes means defining a plurality of additional parallel channels having respective entries provided to relatively abruptly change the overall cross-sectional area of the control rod means.

16. Control rod means for use in a nuclear reactor system as defined in claim 13 wherein said rod length changes and is contoured adjacent the entry end so as to form an undulating endmost surface having at least two separate opposed endmost areas which facilitate engaging a ball-shaped fuel element only in one point.

17. Control rod means for use in a nuclear reactor system as defined in claim 16 wherein each of the two endmost areas is of different relative length in the undulating end surface.

18. Control rod means for use in a nuclear reactor system as defined in claim 16 wherein the rod length changes and is contoured adjacent the entry end to form both a tapered peripheral and an undulating endmost surface formed with at least two separate top or endmost areas which facilitate engaging a ball-shaped fuel element only in one point.

19. Control rod means for use in a nuclear reactor system as defined in claim 18 wherein each endmost area is of different relative length in the undulating end surface.

20. Control rod means for use in a nuclear reactor system as defined in claim 18 wherein the diametrical cross-section of the control rod gradually changes along its length adjacent the entry end.

21. Control rod means as defined in claim 15 wherein said means defining the plurality of additional channels is such as to at least non-fixedly adjoin the rod means forming the single channel, and said rod means further constructed to enable at least said first mentioned single channel tube to be shifted generally telescopically relative to the others.

References Cited

UNITED STATES PATENTS

| | | | |
|---|---|---|---|
| 3,202,581 | 8/1965 | Barr et al. | 176—46 |
| 3,162,577 | 12/1964 | Redman | 176—33 |

FOREIGN PATENTS

| | | | |
|---|---|---|---|
| 749,064 | 5/1956 | Great Britain | 176—45 |
| 1,172,380 | 6/1964 | Germany | 176—45 |

CARL D. QUARFORTH, Primary Examiner

H. E. BEHREND, Assistant Examiner

U.S. Cl. X.R.

176—86 R